US006274181B1

(12) United States Patent
Richison et al.

(10) Patent No.: US 6,274,181 B1
(45) **Date of Patent: *Aug. 14, 2001**

(54) VENTED POUCH ARRANGEMENT AND METHOD

(75) Inventors: Cecil Richison, Hudson, WI (US); Gary M. Bell, Crystal, MN (US)

(73) Assignee: Kapak Corporation, St. Louis Park, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/495,520

(22) Filed: Jan. 31, 2000

Related U.S. Application Data

(63) Continuation of application No. 08/841,450, filed on Apr. 22, 1997, now Pat. No. 6,023,914, which is a continuation of application No. 08/683,671, filed on Jul. 17, 1996, now Pat. No. 6,021,624, which is a continuation of application No. 08/350,727, filed on Dec. 7, 1994, now abandoned, which is a continuation of application No. 08/089,286, filed on Jul. 8, 1993, now abandoned, which is a division of application No. 07/906,686, filed on Jun. 30, 1992, now Pat. No. 5,254,073, which is a continuation of application No. 07/742,401, filed on Aug. 8, 1991, now Pat. No. 5,147,272, which is a division of application No. 07/516,111, filed on Apr. 27, 1990, now Pat. No. 5,059,036.

(51) Int. Cl.[7] .................... A23F 5/00
(52) U.S. Cl. .................... 426/118; 383/103
(58) Field of Search .................... 426/118; 383/100, 383/103

(56) References Cited

U.S. PATENT DOCUMENTS

| | | |
|---|---|---|
| 2,774,402 | 12/1956 | Wikle . |
| 2,865,768 | 12/1958 | Barnes et al. . |
| 2,913,030 | 11/1959 | Fisher . |
| 2,997,224 | 8/1961 | Stannard . |
| 3,229,813 | 1/1966 | Crowe, Jr. et al. . |
| 3,372,625 | 3/1968 | Simecek et al. . |
| 3,468,471 | 9/1969 | Linder . |
| 3,473,589 | 10/1969 | Gotz . |
| 3,503,497 | 3/1970 | Riely et al. . |

(List continued on next page.)

FOREIGN PATENT DOCUMENTS

| | | |
|---|---|---|
| 2265145 | 9/1976 | (DE) . |
| 2933151 | 8/1979 | (DE) . |
| 3031208 | 8/1980 | (DE) . |
| 3229242 | 8/1982 | (DE) . |
| 3-45930 | 12/1989 | (EP) . |
| 93-119312/15 | 9/1992 | (EP) . |
| 1204462 | 9/1970 | (GB) . |
| 1-279073 | 11/1985 | (JP) . |

(List continued on next page.)

OTHER PUBLICATIONS

Exhibit A—Urquhart Affidavit
Exhibit B—exhibits for Urquhart Affidavit
Exhibit C—transcript from Urquhart Affidavit
Exhibit D—Bell Declaration
TIW High Speed Stand Pouch Making Machine, BH–6005, Totoni, Aug. 1984.

*Primary Examiner*—Stephen P. Garbe
(74) *Attorney, Agent, or Firm*—Merchant & Gould P.C.

(57) ABSTRACT

A vented pouch arrangement is described which comprises: first and second opposed panel sections; a base gusset member; and, a gas filter arrangement oriented in one of the panel sections. The gusset member is preferably oriented between the panel sections; along ends thereof, to form a base by which the arrangement can be stood up during use. Preferably, the arrangement is provided with a rib and trough closure arrangement extending there across. In this manner, opening and reclosing the bag construction, for access to material therein, is facilitated. A method for formation of such a pouch arrangement, and methods of use, are also described.

14 Claims, 5 Drawing Sheets

U.S. PATENT DOCUMENTS

| | | | | |
|---|---|---|---|---|
| 3,595,467 | * | 7/1971 | Goglio | 383/100 |
| 3,712,848 | | 1/1973 | Casey, Jr. et al. . | |
| 3,741,778 | | 6/1973 | Rowe . | |
| 3,799,427 | * | 3/1974 | Goglio | 383/100 |
| 3,827,341 | | 8/1974 | Stage . | |
| 3,868,891 | | 3/1975 | Parish . | |
| 3,980,225 | * | 9/1976 | Kan | 383/61 |
| 4,000,846 | * | 1/1977 | Gilbert | 383/100 |
| 4,085,560 | | 4/1978 | McClosky . | |
| 4,134,535 | | 1/1979 | Barthels et al. . | |
| 4,206,870 | * | 6/1980 | DeVries | 383/100 |
| 4,310,118 | * | 1/1982 | Kisida et al. | 383/100 |
| 4,358,466 | | 11/1982 | Stevenson . | |
| 4,420,015 | | 12/1983 | Blaser . | |
| 4,526,565 | | 7/1985 | Hummel et al. . | |
| 4,528,224 | | 7/1985 | Ausnit . | |
| 4,532,652 | | 7/1985 | Herrington . | |
| 4,533,425 | | 8/1985 | Wehle . | |
| 4,553,693 | * | 11/1985 | Terajima et al. | 220/367 |
| 4,601,694 | | 7/1986 | Ausnit . | |
| 4,640,838 | | 2/1987 | Isakson et al. . | |
| 4,818,544 | | 4/1989 | Seward . | |
| 4,903,718 | | 2/1990 | Sullivan . | |
| 4,913,693 | | 4/1990 | Ball et al. . | |
| 4,972,825 | | 11/1990 | Vescovo, Jr. . | |
| 5,035,516 | | 7/1991 | Pacheco . | |
| 5,059,036 | * | 10/1991 | Richison et al. | 383/61 |
| 5,080,155 | | 1/1992 | Crozier . | |
| 5,142,970 | | 9/1992 | ErkenBrack . | |
| 5,147,272 | | 9/1992 | Richison et al. . | |
| 5,240,112 | | 8/1993 | Newburger . | |
| 5,254,073 | | 10/1993 | Richison et al. . | |
| 5,542,902 | | 8/1996 | Richison et al. . | |

FOREIGN PATENT DOCUMENTS

| | | |
|---|---|---|
| 1-111685 | 4/1989 | (JP) . |
| 2-4651 | 1/1990 | (JP) . |
| 3-133747 | 6/1991 | (JP) . |
| 212355 | 9/1991 | (JP) . |

* cited by examiner

FIG. 1
(PRIOR ART)
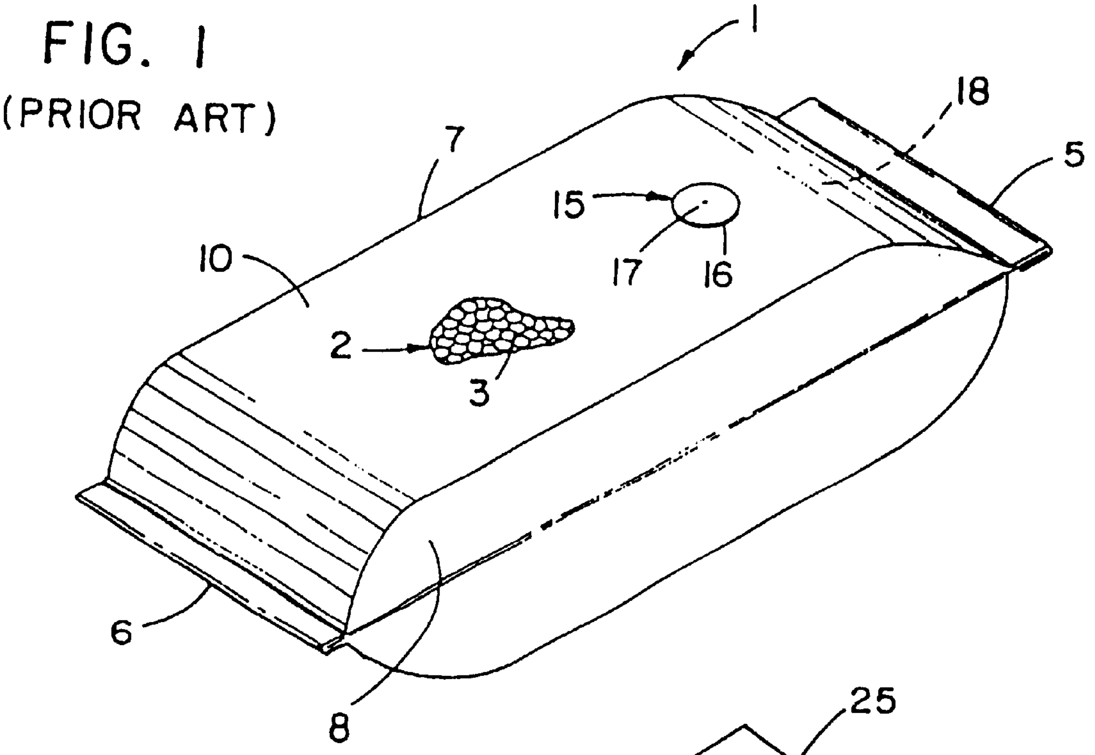
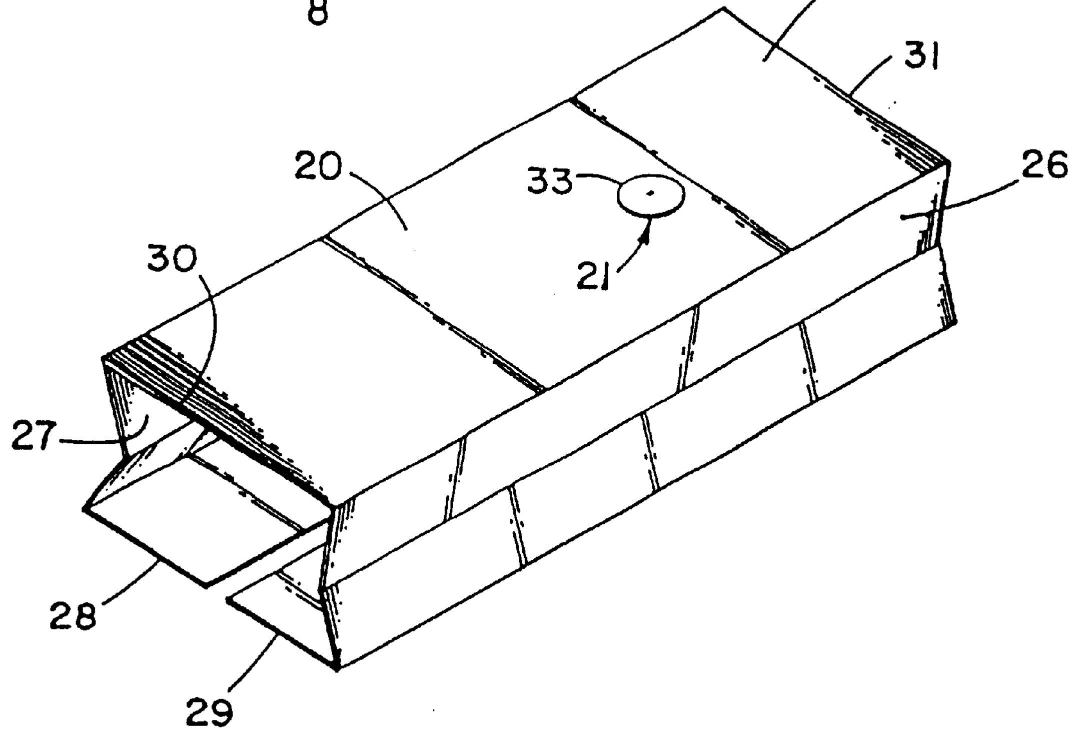
FIG. 2
(PRIOR ART)

FIG. 3
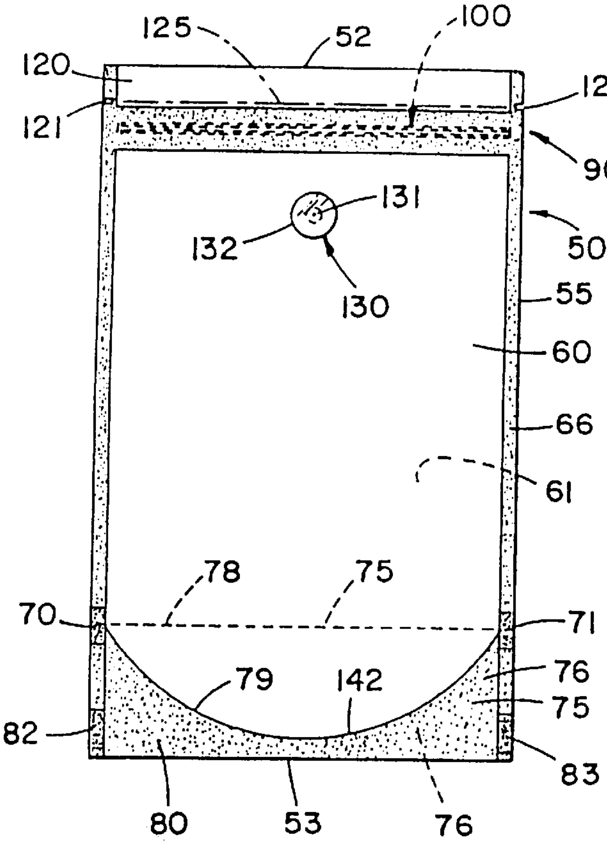
FIG. 5
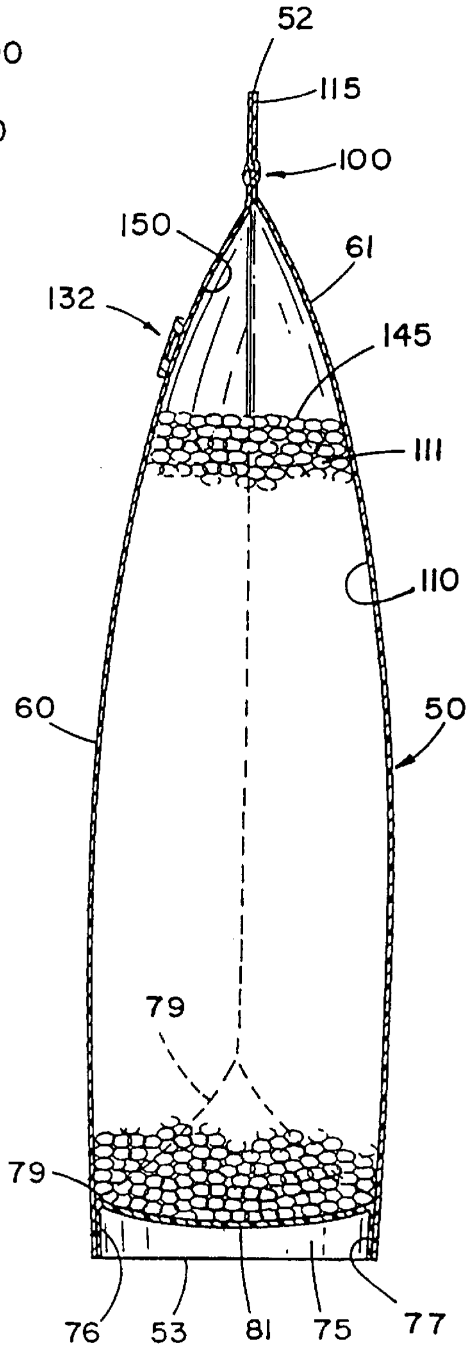
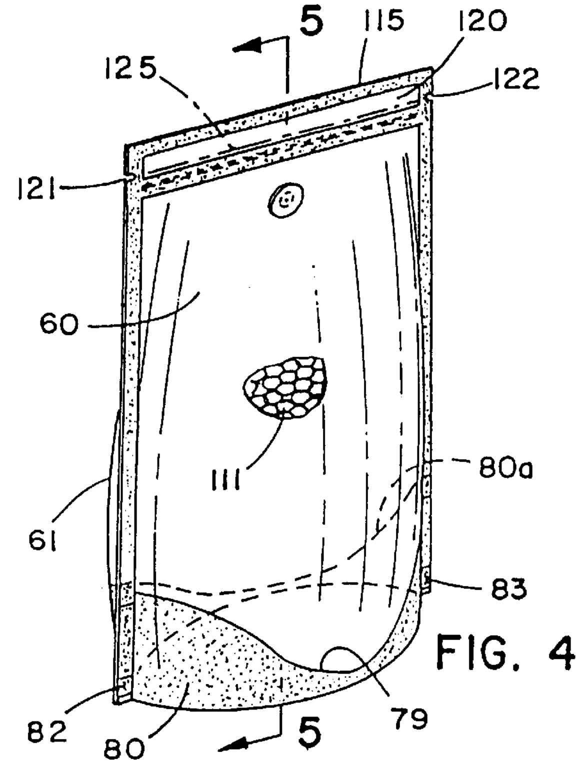
FIG. 4

VENTED POUCH ARRANGEMENT AND METHOD

This application is a continuation of application Ser. No. 08/841,450, filed Apr. 22, 1997. Now U.S. Pat. No. 6,023, 914 application Ser. No. 08/841,450 is a continuation of application Ser. No. 08/683,671, filed Jul. 17, 1996. Now U.S. Pat. No. 6,191,621 application Ser. No. 08/683,671 is a continuation of application Ser. No. 08/350,727, filed Dec. 7, 1994, now abandoned. Application Ser. No. 08/350,727 is a continuation of application Ser. No. 08/089,286, filed Jul. 8, 1993, now abandoned. Application Ser. No. 08/089,286 is a divisional of application Ser. No. 07/906,686, filed Jun. 30, 1992, now U.S. Pat. No. 5,254,073. Application Ser. No. 07/906,686 is a continuation of application Ser. No. 07/742, 401, filed Aug. 8, 1991, now U.S. Pat. No. 5,147,272. Application Ser. No. 07/742,401 is a divisional of application Ser. No. 07/516,111, filed Apr. 27, 1990, now U.S. Pat. No. 5,059,036. Each of these applications and patents are incorporated herein by reference.

FIELD OF THE INVENTION

The present invention generally concerns flexible bags, bag arrangements or pouches that include a gas vent or gas filter arrangement. In particular, the invention concerns an arrangement which in operation: can be closed and sealed about an object or objects contained within the bag arrangement; and, from which certain types of gas build-up in the pouch arrangement interior can be readily released, in a preferred manner. Preferred applications concern such arrangements including means for opening and resealing, during use. The invention also concerns methods for preparing such bag arrangements, and methods of use.

BACKGROUND OF THE INVENTION

A variety of items are marketed enclosed within flexible bags or bag constructions. Among other things, such constructions can generally operate to: protect the enclosed item(s); retain a plurality of items in close association with one another; facilitate storage and handling; facilitate access to a portion of a stored quantity; and/or to inhibit contamination (and maintain freshness) of stored material. A variety of bag designs have been used, for such purposes.

In some instances, items stored within the bag construction are not completely stable, after the construction is sealed closed. For example, at a food processing/packaging plant materials such as coffee beans may be packaged (sealed) within such bag constructions, while hot. As materials such as coffee beans cool, gases are given off. These gases will expand the flexible bag construction taut, and eventually rupture it, unless vented.

To maintain integrity of the bag construction under such circumstances, vented bag arrangements have been developed. A frequently used general type of construction is one which involves an aperture or pore in a side wall of the bag construction, which is covered by a porous filter. As gas pressures build up within the sealed bag arrangement, the gases can pass outwardly through the vented pore and filter, to reestablish equilibrium of pressure between the interior and exterior of the bag. One commercially available filter for such use is the Bosch filter available from Robert Bosch Corporation. This filter arrangement generally comprises a piece of porous polymer material including portions having adhesive thereon, selectively positionable over a pore in the bag.

Conventional vented flexible bag arrangements for containing materials such as coffee have not been completely satisfactory in function. Reasons for this include the following: such constructions have not, in general, been conveniently constructed for ease of opening and resealing; the position of the vent or filter has not been completely desirable for maintenance of integrity during shelf life and use; and, the position of gas vents or filters in such arrangements have not been fully satisfactory with respect to potential interference with the operation thereof by material received within the bag, during use.

A better understanding of conventional arrangements can be obtained from consideration of the conventional arrangement illustrated in FIGS. 1 and 2. In FIG. 1 there is depicted, in perspective, a conventional, vented, flexible bag arrangement 1 having material 2 (such as coffee beans 3) stored therein. Arrangement 1 has first and second closed ends 5 and 6 and opposite sides 7 and 8. End 6 is preferably relatively permanently closed, by staples, adhesive or the like. End 5 is also closed (at the packaging plant) by means such as staples and/or adhesive; however it is opened (by the consumer or user) for access to an interior, to remove coffee 3 therefrom. In use, end 5 is reclosed by rolling that end of the bag up, and clipping, clamping, taping or otherwise securing the rolled up end in a tightly coiled configuration. As arrangement 1 is further depleted of its contents, during further use, end 5 is further rolled and compressed toward end 6. Reasons why this type of closure has been preferred include the fact that to maintain material 2 within arrangement 1 as fresh as reasonably possible, it is generally desirable to leave as little air in the arrangement 1, during storage, as easily manageable.

Still referring to FIG. 1, on an upper surface 10 of arrangement 1 a vent system or arrangement 15 is positioned. Vent arrangement 15 comprises a porous polymer filter arrangement or member 16 positioned over a pore 17. Pore 17 extends through surface 10, into fluid flow communication with an interior 18 of arrangement 1. Gas pressure build-up within arrangement 1, then, is vented by passage of the gases through porous filter member 16. The filter member 16 is selected, however, so that solid particles and the like do not pass there through. Thus, the contents of the bag do not leak outwardly. Also, preferably member 16 is selected so that it acts as a barrier to microorganism and moisture passage into the bag 1, to maintain freshness.

In a typical use, arrangement 1 is constructed with one open end (for example end 5) and is filled with material 2 to be stored, while material 2 is still in a hot state. The open end (end 5 in the example) is then sealed closed, and as the material cools, gases are given off. The gases build up pressure within arrangement 1 and are vented through pore 17 and filter member 16.

When the arrangement is ultimately obtained by a consumer, end 5 is opened, as necessary, for removal of material stored therein. As described above, end 5 is reclosed by collapsing, folding or rolling it toward end 6, and is maintained closed by means such as a retainer, clamp or tape. This practice is repeated, until the contents are completely used.

Typical operation of the arrangement 1 as just described, involves at least two potential problems. First, as end 5 is reopened and reclosed during use by the consumer, eventually the consumer will collapse or roll end past vented arrangement 15. This poses little problem with respect to the required operation of vent arrangement 15, since its purpose will generally have been served prior to the consumer even obtaining the arrangement. However, a potential problem is nevertheless presented. In particular, vent arrangement 15 represents a portion of the overall construction 1 in which, as a result of the pore 17 and the filter member 16, a site of potential failure is presented. For example, in general, conventional arrangements utilized as a filter member 16, are not as flexible as materials used as the side walls, i.e. surface 10, of typical bag constructions 1. If the vent arrangement 15 resists coiling or collapse during the folding/rolling process involving end 5, the vent arrangement 15 or the construction 1 may tear or rupture, leading to a failure in the integrity of a side wall of arrangement 1. Thus, inconvenient spills, etc., may occur. Further, loss of freshness, due to loss of integrity of the closed system, may result. Similar problems would occur if instead of rupture, separation of the filter member 16 from the construction 1 occurred.

Another potential problem is presented from the location of arrangement 15. In particular, its position is such that when arrangement 1 is filled during packaging, solid material is present within arrangement 1, directly adjacent vent arrangement 15. Such solid material may interfere with free flow of gases through the vent arrangement 15. For example, prior to cooling and releasing of gases, small particles (i.e. dust) within the stored material 2 may block pore 17 and/or filter 16, so that when the gases are released from the stored material, they are not as readily vented from the bag arrangement 1.

Another potential problem with the arrangement of FIG. 1 is that it is not especially convenient for the consumer to use, from the point of view of opening and reclosing. For some consumers it may be inconvenient to perform the ritual of rolling the end 5 of arrangement 1, between uses, and finding a method of maintaining same closed, for example, through use of tape or clamps. While some conventional arrangements include wires therein (or tape thereon) to facilitate the process, these may be relatively expensive to provide and/or inconvenient to use. Further, they may represent yet another site of potential failure in the construction or maintenance of closure.

To further facilitate understanding of the arrangement of FIG. 1, attention is directed to FIG. 2. FIG. 2 is a perspective view of a panel 20 having a vent arrangement 21 therein, from which an arrangement such as that of FIG. 1 can be formed. That is, arrangement 1 of FIG. 1 is formed from a single panel, and thus provides for a single seam. Formation of the seam will be understood by reference to FIG. 2, wherein panel 20 is shown folded to form upper surface 25 opposite side gussets 26 and 27, and back panels 28 and 29. In practice, a tube arrangement (with a single longitudinal seam) is formed by joining back panels 28 and 29 to one another. The tube arrangement is then closed along one end, for example end 30, prior to filling with material. After filling with material, the opposite end 31 is then closed, the result being an arrangement similar to that shown in FIG. 1. In some instances the filter member 33 of the vent arrangement 21 is applied after formation of the bag, rather than before.

SUMMARY OF THE INVENTION

According to the principles of the present invention, a pouch arrangement is provided which comprises: first and second opposed panel sections; a base gusset member; and, a gas filter arrangement oriented in one of the panel sections. The gusset member is preferably oriented between the panel sections, along ends thereof, to form a base by which the arrangement can be stood up during use. Since the arrangement can be readily stood up during filling, venting and use, it can be filled such that the solid material does not reach a level of position of the gas filter arrangement. In this manner interruption of operation of the gas filter arrangement, by material stored within the bag during filling, can be inhibited if desired. As will be seen from the detailed descriptions, the two panel arrangement facilitates this, by providing, through use of an upper transverse seal or seam, for a slanted side wall portion, which tends to lift and project the vent arrangement, when appropriately positioned, out of contact with solid material stored therein.

Preferably the arrangement is provided with closure means extending there across, provided with means for selective opening and reclosing of the pouch construction. A preferred such closure means is a rib and trough closure arrangement, such as sold under the trademark Ziploc® by Dow or ZipPak by Mini-Grip, Inc. In this manner, opening and reclosing the bag construction, for access to material therein, is facilitated. Further, it is facilitated in a manner which does not involve rolling or otherwise manipulating the material of the flexible bag in the region of the vent arrangement. Thus, potential failure in a manner similar to that of conventional Systems is inhibited to advantage.

The preferred gas filter arrangement comprises a pore in one of the panel sections, with a filter arrangement such as porous filter member mounted thereover. Preferably the pore is relatively small in diameter, i.e. no greater than about 2.0 mm, more preferably no more than about 1.0 mm.

In preferred embodiments, the orientation of the gas filter arrangement pore, relative to the rib and trough closure arrangement, is selected to facilitate maintenance of the gas filter arrangement relatively clear of solid material when the material is poured into the bag construction during packaging and the bag construction is stood upright. In general, this is done by maintaining the pore arrangement within a preferred distance of the rib and trough closure system definable as a percentage of the distance between the rib and trough closure arrangement and the base gusset (or bag end adjacent the base gusset). Preferably, the pore is positioned within about 2% to about 30% of the distance between the rib and trough closure arrangement and the bottom gusset or panel end edges. More preferably, it is positioned within about 4 to 17% of that distance. In a typical preferred application it will be positioned about 2.5 to 5.0 cm from the rib and trough closure arrangement.

For the most preferred arrangements, the rib and trough closure arrangement is positioned a selected distance of at least 0.75 cm from an end of the bag arrangement. As a result, room is left over for a seal such as a heat seal across an open end of the bag, during packaging. Further, a tab arrangement is formed which can be cut or removed from the bag by the consumer, during use. Removal of this tab arrangement is facilitated, by selected positioning of tear notches in the bag arrangement.

The principles described herein also concern preferred methods for creating vented bag arrangements. One such preferred method comprises providing a continuous full web of panel sections of material; splitting the full web into first and second continuous half webs of panel section material; punching a pore into one of the two half webs of panel section material; forming a pouch arrangement from the first and second half webs, the pouch arrangement having opposed front and back panels, the front panel having the pore therein; and, applying a filter arrangement over the pore. Preferably the method includes positioning a base gusset between the front and back panels in a preferred orientation for operation in the completed arrangement. Most preferably, a rib and trough closure arrangement is also operably oriented between the front and back panels, during construction. In general, the method will also include steps of providing appropriate seals between adjoining members; and, trimming as necessary to provide the pouch.

The method described above lends itself well toward mass production techniques, utilizing continuous webs wherein a plurality of pores are positioned into one of the two half webs, and a plurality of pouch arrangements, each having one pore therein, are formed. In some applications a wide web can be provided in a manner forming two adjacent lines of pouches.

It will be understood that in alternate applications, the methods may involve forming the two panels from separate webs of material, rather than a single continuous web split into two half webs. In general, a decision about which method to utilize will depend in part upon availability of webs and the design of selected machinery for manufacture.

The pore may be created in a variety of manners. One convenient manner is through utilization of a punch or the like. The punch may be applied with sufficient force to create a small tear or rupture in the bag, of a size appropriate for forming a vent arrangement.

The methods described are advantageous, as the pore is applied in one of the panels before the two panel construction is formed. Thus, there is no risk of punching the pore completely through the bag or pouch arrangement.

BRIEF DESCRIPTION OF THE DRAWINGS

The drawings constitute part of the specification and disclose details concerning preferred constructions and/or methods according to the invention. It will be understood that in some instances, relative material thicknesses or component sizes may be shown exaggerated, to facilitate an understanding of the invention.

FIG. 1 is a perspective view of a prior art bag construction involving a vent arrangement.

FIG. 2 is a perspective view of a panel arrangement depicted during a step of folding for the formation of an arrangement such as that shown in FIG. 1.

FIG. 3 is a front view of a flexible bag construction according to the present invention.

FIG. 4 is a perspective view of the arrangement shown in FIG. 3; FIG. 4 depicting the arrangement filled with material, for storage.

FIG. 5 is a cross-sectional view of FIG. 4 taken generally along line 5–5 thereof.

DETAILED DESCRIPTION OF THE INVENTION

Figure 6:
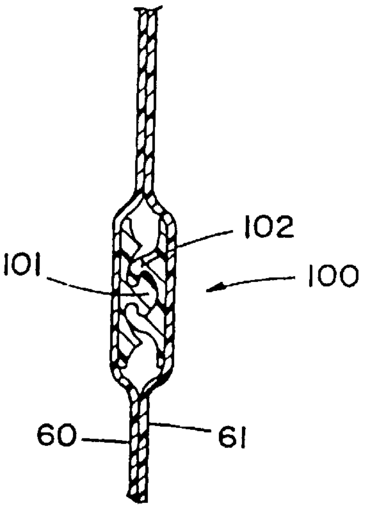
FIG. 6 is an enlarged fragmentary view of a portion of FIG. 5.

As required, a detailed disclosure of the present invention is provided herein. The detailed descriptions of arrangements and methods will be understood to be exemplary only, to provide support for the claims. That is, the arrangements and methods described herein are not to be interpreted as limiting, but rather as providing a representative basis for the claims presented herein.

In FIG. 3 a preferred bag or pouch arrangement 50 according to the present invention is depicted. Pouch arrangement 50 is rectangular, although other arrangements may be utilized. Arrangement 50 has first and second, opposite, ends 52 and 53; and, first and second opposite side edge portions 54 and 55.

The arrangement of FIG. 3 is formed from first and second, opposed, panel sections, 60 and 61. Each of sections 60 and 61 includes first and second end edge portions and first and second opposite side edge portions, which respectively correspond to end edges 52 and 53, and side edge 54 and 55 of the overall arrangement 50. Panel sections 60 and 61 are secured (sealed) to one another along portions of side edge portions 54 and 55. For the preferred arrangement shown in FIG. 3, this is by means of seals 65 and 66, respectively. Seals 65 and 66 extend along side edge portions 54 and 55 respectively, between end 52 and points 70 and 71, respectively. For preferred embodiments the panel sections are formed from flexible, heat-sealable material, and seals 65 and 66 are heat seals.

As previously explained, each of sections 60 and 61 includes an end portion or end edge which corresponds to the end edge 53 of the overall arrangement 50. In this portion of the arrangement 50 (i.e. near edge 53), a base gusset or bottom gusset 75 is positioned. Gusset 75 includes two side panels 76 and 77 separated (when the arrangement is collapsed, FIG. 3) by a hinge fold line 78. Gusset member panel 76 is secured to panel section 60 by means such as heat sealing, preferably defining a curved line as shown at 79, FIGS. 3 and 4, the sealing being shown in region 80; and, gusset panel 77 is secured to panel section 61 by similar means (curved line 80*a*, FIG. 4). Referring to FIG. 5, when the pouch 50 is filled and expanded, the bottom gusset side panels 76 and 77 drop and form a base 81.

For the preferred arrangement illustrated in FIG. 3, at base corner regions 82 and 83 the panel sections 60 and 61, along with gusset panels 76 and 77 are pinched and secured to one another in a four-ply conformation. Thus, at corners 82 and 83 the panel sections 60 and 61 preferably do not spread, when the arrangement 50 is filled, FIGS. 4 and 5.

As a result of the two panel section (60, 61) and base gusset (75) arrangement, thus far described, bag construction 50 is oriented such that when filled or partially filled, the base gusset 75 can expand in a manner supporting the arrangement in a standing or upright position. This is illustrated, for example, in FIGS. 4 and 5, wherein arrangement 50 is depicted expanded as it would be when filled with material. Such two panel section arrangements, with edge seals and a bottom gusset, as thus far described, are known.

Pouch arrangement 50 is provided with closure means 90 adapted (i.e. constructed and arranged) for selective opening and closing of the arrangement, for access to material received therein. For the preferred embodiment illustrated in FIGS. 3, 4 and 5, the closure means 90 comprises a rib and trough closure arrangement 100. The rib and trough arrangement 100 includes (FIG. 6) an elongate rib member 101 releasably securable within a elongate trough member 102. A variety of specific constructions may be utilized, including those available under the trademark Ziploc® from Dow and ZipPak from Mini-Grip, Inc.

In general, the rib and trough closure arrangement 100 extends across pouch arrangement 50, i.e. in FIG. 3 substantially between side edges 54 and 55, or alternatively stated between edge seams 65 and 66. It will be understood that, in general, the interior 110 of arrangement 50, FIG. 5, is generally defined between closure arrangement 100 and bottom gusset or base gusset 75. Rib and trough closure arrangement 100 facilitates access to the interior 110 by the consumer, in use. Because it (the closure means) is readily resealable, it provides a convenient means for maintaining material 111 stored within arrangement 50 in a relatively fresh state. Since panels 60 and 61 are collapsible, in general they may be readily pressed against one another, before complete closing of arrangement 100, to vent excess air from within the arrangement 50. This, it will be understood, can be readily accomplished without the inconvenience of rolling edge 52 toward bottom gusset 75, i.e. end 53.

Preferably, the closure means, i.e. rib and trough closure arrangement 100, is oriented spaced from end 52, FIG. 3, a sufficient amount to allow for positioning of an end seal, for example a heat seal, at end 52 during commercial packaging, see for example end seal 115, FIGS. 4 and 5. A reason for this is that such an end seam, for example a heat seal, is preferably applied during factory packaging to facilitate retention of a secure seal about enclosed material 111. It will be understood that the rib and trough closure arrangement 100 is convenient for use by the consumer, but does not provide a relatively permanent seal such as is often preferred for commercial packing, storage and shipping operations. Preferably, arrangement 100 is positioned at least 0.75 cm from end 52, more preferably at least about 1.5 cm therefrom. Such an arrangement readily accommodates a conventional end seal 115 formed as a heat seal, which typically has a width of at least about 0.5 cm.

Referring to FIG. 3, as a result of the spacing from end 52, a tab region 120 is formed which is to be cut or torn open by the consumer, when initial access to the interior 110 of arrangement 50 is desired. For the preferred arrangement, opening is facilitated by positioning tear notches 121 and 122 at opposite side edges 54 and 55 of arrangement 50, between closure arrangement 100 and end 52, in a manner developing a preferred tear line 125 across arrangement 50 (preferably parallel to the rib and trough closure arrangement 100) for opening. The tear notches preferably are completely contained within edge seals 65 and 66, to facilitate integrity of closure.

Figure 7:
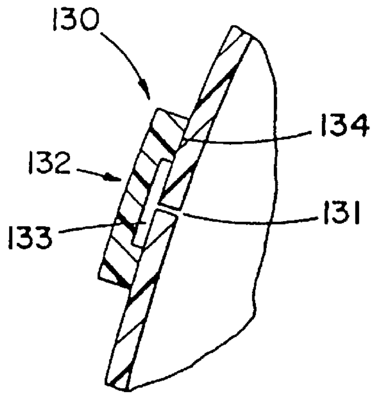
FIG. 7 is an enlarged fragmentary view of a portion of FIG. 5.
Figure 10:
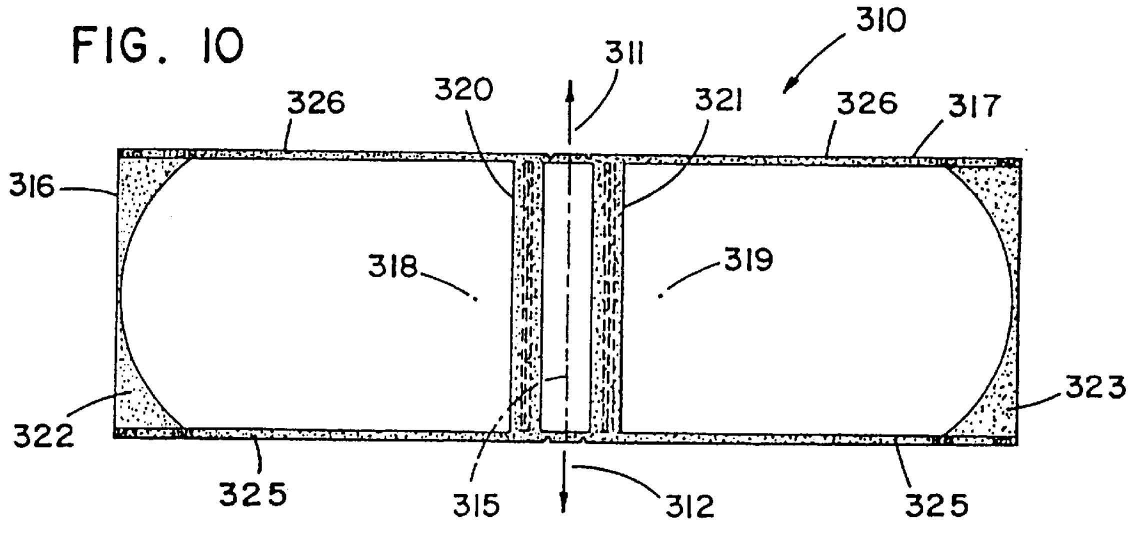
FIG. 10 is a schematic representation of a step of the preferred application of the schematic illustrated in FIG. 9.

Referring to FIG. 3, arrangement 50 includes a vent arrangement 130 on one panel section 60 thereof. Preferably arrangement 130 comprises means whereby gas pressure that may build within interior 110 of bag arrangement 50, when sealed closed, can be equilibrated with ambient pressure. More specifically, should the gas pressure within seal arrangement 50 exceed ambient, or tend to exceed ambient, gas will preferably be vented through vent arrangement 130, re-equilibrating the system. Preferably, arrangement 130 (FIG. 7) comprises a pore 131 covered by a gas permeable filter arrangement preferably comprising filter member 132. A preferred such arrangement comprises a pore having a size less than about 2.0 mm, preferably less than about 1.0 mm, covered by a porous polymeric member. Preferably the filter member or arrangement 132 includes a central recess 133 and an outer adhesive periphery 134, FIG. 7. Appropriate porous members are sold as Bosch filters, by Fres-Co System USA, Inc. Such filters generally contain a circular piece of polymer material having an outer periphery provided with adhesive, for retention about a pore 131.

Referring to FIGS. 4 and 5, certain advantages from the present construction will be understood. Referring specifically to FIG. 5, it will be understood that arrangement 130 can be readily positioned above an upper level 145 of material 111 contained within interior 110 during the venting process. Thus, it is not likely that material 111 will directly interfere with operation of arrangement 130. This is facilitated by the fact that arrangement 130 is provided with a base gusset 75 upon which it stands during storage. Thus, during packaging, material 145 can be poured into arrangement 50 through end 52, up to a level below arrangement 130, if desired.

To facilitate operation, preferably vent arrangement 130 is positioned in a portion 150 of panel section 60 which slants substantially inwardly toward opposite section 61, when arrangement 50 is filled or partially filled. This is accomplished, by positioning vent arrangement 130 substantially near the upper sealing arrangement, for example closure means 100 (or end seam 115) and is facilitated by the two panel (i.e. front and back panel) construction. The preferred, precise, positioning will depend, primarily, upon the overall length, i.e. height, of arrangement 50, FIG. 5. In general, the vent arrangement 130 will be appropriately positioned if located a distance from rib and trough closure arrangement 100 corresponding to about 2.0 to 30.0% of the distance of rib and trough closure arrangement 100 from end 53 or bottom gusset 75, FIG. 5; i.e. from a furthermost point 145 and seal 79, FIG. 3. More preferably, vent arrangement 130 is located within about 4.0 to 17% of that distance. In typical preferred applications the pore 131 should be positioned about 2.5 to 5.0 cm from the rib and trough closure arrangement. Such positioning assures that it will be in upper region 150, preferably above level 145 if desired. Such a positioning facilitates operation without substantial waste of interior volume 110, since arrangement 130 is positioned in a portion whereat panels 60 and 61 collapse toward one another substantially. This will also tend to keep arrangement 130 directed upwardly, above material 111.

Figure 8:
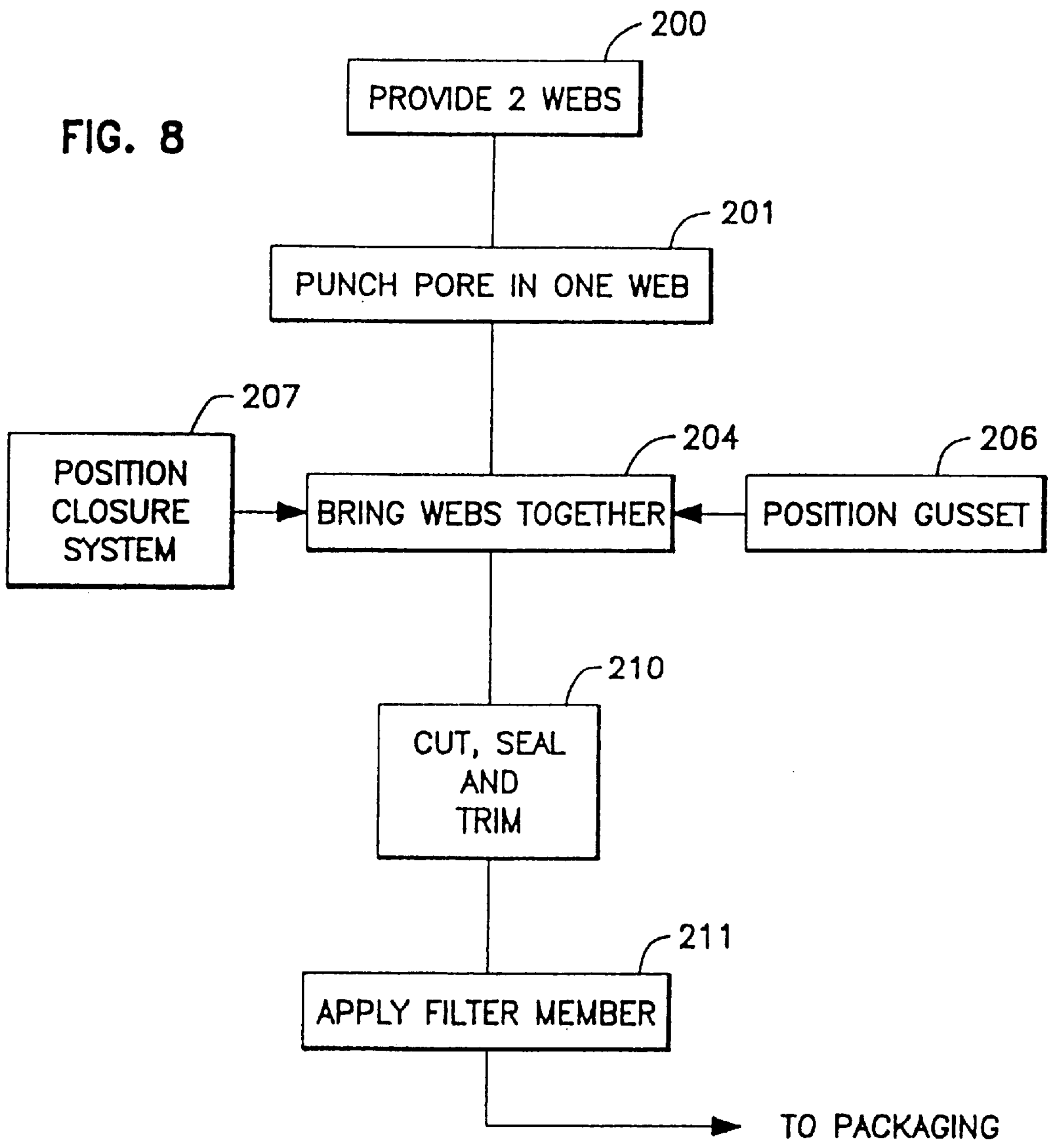
FIG. 8 is a schematic flow chart of a preferred method of preparing a bag arrangement according to the present invention.

While a variety of means may be utilized to prepare arrangements according to FIGS. 3–5, herein a preferred, convenient, method is described. The general steps are illustrated in the flow diagram of FIG. 8.

According to the method, two webs of material, each preferably being of approximately the same width and preferably continuous, are provided, at 200. A pore is punched in one web, at 201. The two webs will be brought together, in opposition to one another at 204. It is these two webs, when cut in sections, that will form opposite panels, for example panels 60 and 61, FIG. 3, of the arrangement. In preferred applications, longitudinal direction of the two webs, i.e. the continuous direction, will in general correspond to the transverse direction of the arrangement when completed.

Again, before the two webs are brought together, a pore is provided in one of the webs, 201. The pore is positioned such that it will be appropriately oriented as the venting pore, i.e. pore 131, FIG. 3, of the completed product. The pore may be formed in a variety of means, including by means of a punch apparatus.

In the next step 204, the two webs are brought together in opposition, ultimately to comprise panel sections 60 and 61. During the step of bringing the webs together, a continuous strip of gusset material is preferably fed therebetween (at 206), along an edge; and, a continuous strip comprising the closure arrangement, i.e. a rib and trough closure means, is also fed between the panel sections (at 207).

In a later step of the process (at 210), the continuous composite which comprises: a first web having a hole punched therein; a second web opposed to the first web; and, a continuous gusset web and a continuous closure arrangement, both of which are positioned between the two panel webs, is cut, trimmed and sealed, preferably by heat sealing, into a pouch arrangement corresponding to arrangement 50, with one open end, for example corresponding to end 52, FIG. 3. Following this step,.for preferred applications at 211 a porous filter member corresponding to filter member 132, FIG. 3, is applied over the pore. Of course, the filter member could be applied before trimming and sealing, if desired.

It will be understood that continuous, mass, manufacture of articles (pouches) from a pair of continuous webs can be facilitated by punching a plurality of holes into one of the two webs, the holes being oriented and spaced apart appropriately.

In some applications it may be desirable to form the two webs (to be brought together) from a single roll or web of material. This can be done, for example, by providing a primary web which is split in half, longitudinally, to form two half webs. These webs can then be utilized as the two webs of the schematic illustrated in FIG. 8.

Figures 9, 12:
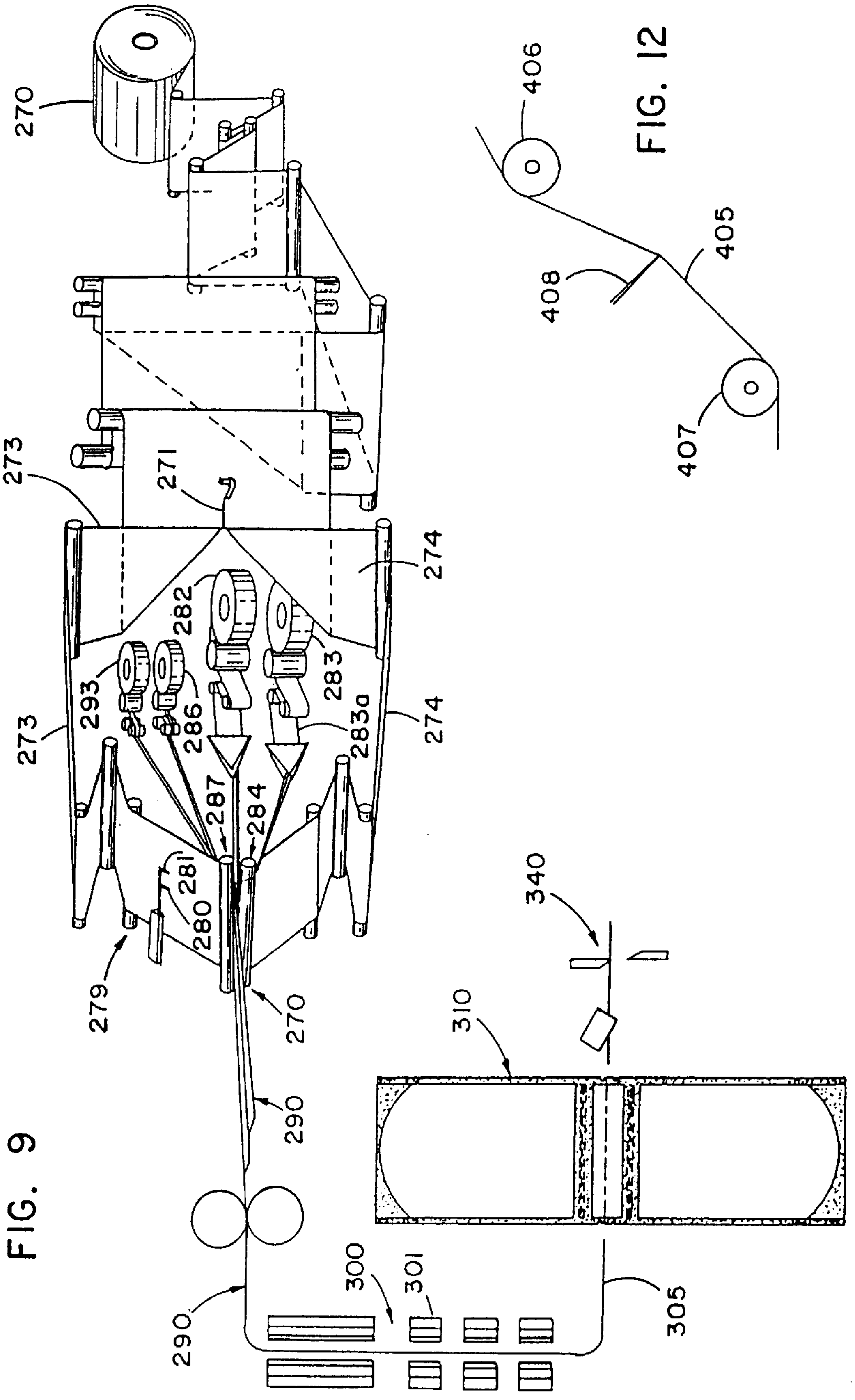
FIG. 9 is a schematic representation of certain of the steps illustrated in a preferred application of the method shown in the schematic flow chart of FIG. 8.
FIG. 12 is a schematic representation of a step of the preferred application of the schematic illustrated in FIG. 9.

Schematics illustrating the principles of FIG. 6, are shown in FIGS. 9–12. Referring to FIG. 9, a single web of material 270 is shown split in half, longitudinally, at line 271, to form first and second half webs 273 and 274. The webs are shown fed toward a station 277 whereat they are positioned in opposition to one another. Prior to reaching station 277, one of the webs 273 is pierced or ruptured, i.e. a pore is formed therein which will eventually become the pore of a vent arrangement in a bag formed therefrom. This is done before the webs are brought together, to facilitate formation of the pore without rupturing completely through both panel sections of the arrangement, i.e. through both webs. In FIG. 9, a step of forming the pore is illustrated at station 279.

For the system shown in FIG. 9, the webs 273 and 274 are brought together to form two transversely positioned pouches, in a head-to-head fashion, at the same time. By "head-to-head" it is meant that the pouches are formed adjoined to one another along tab sections corresponding to tab section 120, FIG. 3, and during a later cutting and trimming process, they are cut apart. Since two pouches are formed at any given time at station 279 two pores are provided at station 279, by means of arrangements 280 and 281, respectively.

At station 277, whereat webs 273 and 274 are directed toward one another for ultimate formation of the pouches, a continuous web 283 of base gusset material 283*a* is shown fed in at 284; and, a continuous strip 286 of rib and trough closure material is shown fed in at point 287. At station 277 all four are oriented, for formation of a pouch arrangement such as arrangement 50, FIG. 3. That is, an overall continuous composite 290 is formed.

As previously mentioned, for the preferred process, at station 277 two longitudinally spaced pouches are formed. Thus, the composite formed at station 277 comprises a continuous web having a center longitudinal line dividing it into a first and second half, each half comprising the structures of pouches according to the present invention. Thus, at station 277 a second web 293 of gusset material is fed into the arrangement; and, a second web 293 of rib and trough closure material is also fed into the station 277.

Figure 11:
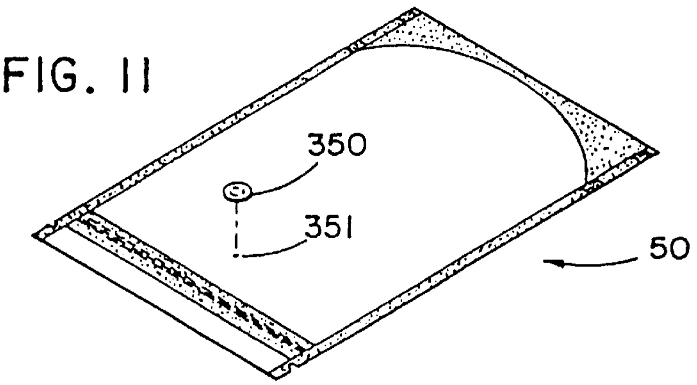
FIG. 11 is a representation of a step of applying a filter arrangement to a pouch arrangement according to the present invention.

The general configuration of the composite of web material leaving station 277 will generally be understood, by reference to the overall continuous composite as it appears after heat sealing but prior to trimming, this is shown in FIG. 11, discussed below.

Still referring to FIG. 9, at 300 the continuous web composite 290 passes through heat sealing arrangements 301, to render appropriate heat sealing in the construction. The general appearance of the web 305 as it leaves the heat sealing apparatus will be understood by reference to region 310 which shows the web construction from a top plan view. In particular, attention is directed to FIG. 10 which shows region 310 in detail.

Web construction 310 is preferably continuous in a direction indicated by arrows 311 and 312. Eventually it will be cut along center line 315 into first and second opposite halves 316 and 317, each of which will be formed into a pouch arrangement. Each of halves 316 and 317 includes: a pore for a vent arrangement (318, 319); a rib and trough closure arrangement (320, 321); a base gusset (322, 323); and, opposite edge seals (325, 326).

The continuous strip 310 is advanced to cutting and trimming station 340 (FIG. 9) whereat it is split in half and each half is trimmed into individual pouches.

It will be understood that the base gusset and rib and trough closure arrangement of one half of construction 310 resulted from gusset feed 283 and rib and trough closure feed 286; and, the gusset and rib and trough closure arrangement of the other half resulted from the other feeds 292 and 293, respectively.

In FIG. 11, a next step of positioning a filter 350 over a pore 351 is shown. Preferably, this step will be conducted after the pouch arrangement has been sectioned from the continuous strip. Pore 351, it will be recalled, resulted from punching at station 279.

A variety of means may be utilized to create pores in one of the continuous webs. In FIG. 12, a preferred process is shown wherein a web 405 in which a pore is to be punched, is tightly stretched between stations 406 and 407. While web 405 is stretched taut, a blunt punch 408 or the like is struck thereagainst, sufficiently rupturing web 405 to form a small pore therein. The punch 408 may correspond to apparatus 280 or 281, FIG. 9.

A preferred method of use of the arrangement shown in FIGS. 3–5 will be readily understood by examination of FIG. 5. Preferably, the bag, having been formed for example by the process described with respect to FIGS. 9–12, is filled or partially filled with material to be stored therein, with the bag being oriented substantially vertically as shown in FIG. 5, i.e. with upper end 52 at a highest location. Preferably the pouch arrangement is filled such that an upper level 145 of the material 111 is below vent arrangement 130. The bag arrangement can then be sealed along edge 52, for example, by heat sealing methods. Also preferably at the same time, or as appropriate just before or after heat sealing, closure arrangement 100 is also sealed, for convenience.

It will be understood that the arrangement of FIG. 5 is particularly convenient for display in a store, or stores. This results from the fact that the arrangement 50 includes a base gusset 75, so it can be supported substantially vertically. Thus, advertising indicia or the like on either or both of panels 60 or 61 will be readily viewable to the consumer.

Pouch arrangements according to the present invention may be manufactured from a variety of materials. It is particularly advantageous, however, that they be constructed from relatively thin strong material such as polyester film, particularly metallized polyester film. Preferred embodiments which are particularly useful, and include advantages according to the present invention, may be constructed wherein the first and second panel portions comprise first and second sheets of metallized polyester polyolefin laminate film, each having a thickness within a range of about 1.5–6.0 mil, more preferably about 3.0–5.0 mil. Similar material may be utilized for the base gusset. Preferably, heat sealable metallized polyester/polyolefin film is utilized, so that the means of securing the panel portions to one another, securing the closure means to the panel portions, and securing the gusset in place, is by heat seals without the need for additional adhesive.

One preferred metallized polyester film material utilizable to form bag arrangements according to the present invention is available from Flexicon, Inc., under the designation Laminated Metallized Polyester. It comprises a 48 gauge ICI #443 metallized polyethylene material metallized to 2.0–4.0% light transmission. Another material that may be utilized is heat sealable polyester film number 48, a non-metallized film available from 3M under the trademark SCOTCHPACK®. Such material has a tensile strength of about 9 lb/inch width, 100% elongation, burst strength about 50 lb/inch$^2$, edge tear strength about 1,000 grams and Elmendorf tear strength of 80+grams. The suggested heat seal conditions for such an arrangement are about 300–400°F for 0.2–2.0 seconds at 20–60 psi.

It is also noted that Totani Giken Kegyo Co., Ltd. of Kyoto, Japan, produces a pouch making machine under the designation BH-600S which can be utilized to form two panel pouches having a base gusset. Such an apparatus can be modified to provide for pouch arrangements according to the present invention, including closure arrangements and vent pores therein.

Pouch arrangements according to the present invention may be provided with a variety of outer dimensions, depending upon the intended use. A particular convenient arrangement has dimensions 26 cm by 16.5 cm.

It is to be understood that while certain embodiments of the present invention have been illustrated and described, it is not to be limited to specific forms or arrangements herein described and shown.

What is claimed is:

1. A pouch arrangement comprising:

(a) first and second, opposed, panel sections;

(i) each of said panel sections having a first end edge, a second end edge and opposite side edge portions extending between said first and second end edges;

(ii) said first and second panel sections being sealingly secured to one another along at least a portion of said panel section side edge portions, to form a pouch construction having an exterior surface, an interior and side seals;

(iii) said first and second panel sections being secured together along each of said panel section first end edges to form an end seal and to close a first end of said pouch construction;

(A) said end seal being selectively removable from a remaining portion of said pouch construction, when access to said pouch construction interior is desired;

(b) a base gusset member;

(i) said base gusset member between said first and second panel sections, along said second end edges thereof, to close a second end of said pouch construction;

(ii) said base gusset member being constructed and arranged to support said pouch construction in a standing orientation, on said base gusset member and with said first and second panel sections extending upwardly therefrom;

(c) a rib and trough closure arrangement extending between said opposite side edge portions of said panel sections and being oriented between said end seal and said base gusset member;

(i) said rib and trough closure arrangement being constructed and arranged for selective closure of said pouch construction at said first end, when said end seal has been removed;

(d) said pouch construction interior being at least partially filled with coffee beans;

(i) said coffee beans filling said pouch construction interior between said base gusset member and a level below said rib and trough closure arrangement when said pouch construction is in a standing orientation;

(ii) said coffee beans releasing gases within said pouch construction interior; and (e) a gas vent arrangement oriented on said first panel section; said gas vent arrangement being: constructed and arranged for selective flow of gas outwardly therethrough from said pouch construction, in response to a selected greater than ambient gas pressure within said pouch construction when closed; and constructed and arranged to inhibit gas flow into said pouch construction when said pouch construction is closed and a gas pressure within said pouch construction does not exceed said selected greater than ambient gas pressure;

(i) said gas vent arrangement comprising at least one pore in said first panel section and covered by a control member;

(A) said gas vent arrangement being oriented on said first panel section between said rib and trough closure arrangement and said base gusset member to permit said control member to selectively control passage of gas being released from said coffee beans through said at least one pore.

2. A pouch arrangement according to claim 1 wherein:

(a) said control member is positioned on said exterior surface of said pouch construction.

3. A pouch arrangement according to claim 1 wherein:

(a) said gas vent arrangement is positioned on said first panel section between said rib and trough closure arrangement and said level of said coffee beans.

4. A pouch arrangement according to claim 1 wherein:

(a) said base gusset member comprises a separate piece of material from said first and second panel sections.

5. A pouch arrangement according to claim 1 wherein:

(a) said end seal has a width of at least 0.5 centimeters.

6. A pouch arrangement according to claim 1 wherein:

(a) said gas vent arrangement is positioned on said first panel section a first distance from said rib and trough closure arrangement and toward said panel section second end edges; said first distance being about 2% to about 30% of a distance between said rib and trough closure arrangement and said panel section second end edges.

7. A pouch arrangement according to claim 1 wherein:

(a) said gas vent arrangement is positioned on said first panel section a first distance from said rib and trough closure arrangement and toward said panel section second end edges; said first distance being at least 2.5 centimeters from said rib and trough closure arrangement.

8. A pouch arrangement according to claim 1 wherein:

(a) said gas vent arrangement is positioned on said first panel section a first distance from said rib and trough closure arrangement and toward said panel section second end edges; said first distance being no greater than 30% of a distance between said rib and trough closure arrangement and said panel section second end edges.

9. A pouch arrangement according to claim 1 wherein:

(a) said gas vent arrangement is positioned on said first panel section a first distance from said rib and trough closure arrangement and toward said panel section second end edges; said first distance at least 2% of a distance between said rib and trough closure arrangement and said panel section second end edges.

10. A pouch arrangement comprising:

(a) first and second, opposed, panel sections;

(i) each of said panel sections having a first end edge, a second end edge and opposite side edge portions extending between said first and second end edges;

(ii) said first and second panel sections being sealingly secured to one another along at least a portion of said panel section side edge portions, to form a pouch construction having an exterior surface, an interior and side seals;

(b) a base gusset member, (i) said gusset member between said first and second panel sections, along said second end edges thereof, to close an end of said pouch construction;

(ii) said base gusset member being constructed and arranged to support said pouch construction in a standing orientation, on said base gusset member and with said first and second panel sections extending upwardly therefrom;

(c) a rib and trough closure arrangement extending between said opposite side edge portions of said panel sections; said rib and trough closure arrangement being constructed and arranged for selective closure of said pouch construction at an end thereof opposite said base gusset member;

(d) said pouch construction interior being at least partially filled with coffee beans;

(i) said coffee beans filling said pouch construction interior between said base gusset member and a level below said rib and trough closure arrangement when said pouch construction is in a standing orientation;

(e) at least a part of the first panel section being slanted toward the second panel section;

(i) said part of the first panel section that is slanted being between said rib and trough closure arrangement and at least a portion of said coffee beans;

(f) a gas vent arrangement oriented on said first panel section; said gas vent arrangement being: constructed and arranged for selective flow of gas outwardly therethrough from said pouch construction, in response to a selected greater than ambient gas pressure within said pouch construction when closed; and constructed and arranged to inhibit gas flow into said pouch construction when said pouch construction is closed and a gas pressure within said pouch construction does not exceed said selected greater than ambient gas pressure;

(i) said gas vent arrangement comprising at least one pore in said first panel section and covered by a control member; said control member being constructed and arranged to selectively control passage of gas therethrough;

(A) said control member being secured to said first panel section at said part of the first panel section slanted inwardly toward said second panel section.

11. A pouch arrangement according to claim 10 wherein:

(a) said control member is positioned on said first panel section between said rib and trough closure arrangement and said level of said coffee beans.

12. A pouch arrangement according to claim 10 wherein:

(a) said control member is positioned on said exterior surface of said pouch construction.

13. A pouch arrangement according to claim 10 wherein:

(a) said control member is positioned on said first panel section a first distance from said rib and trough closure arrangement and toward said panel section second end edges; said first distance being about 2.5–5.0 centimeters from said rib and trough closure arrangement.

14. A pouch arrangement according to claim 10 wherein:

(a) said pore is circular with a diameter no greater than 2.0 mm.

* * * * *